United States Patent [19]

Blaisdell

[11] 4,403,276
[45] Sep. 6, 1983

[54] FRONT LOADING PROJECTION UNIT WITH SNAP IN CAPSULE

[75] Inventor: Ronald G. Blaisdell, Saugus, Mass.

[73] Assignee: GTE Products Corporation, Stamford, Conn.

[21] Appl. No.: 212,470

[22] Filed: Dec. 3, 1980

[51] Int. Cl.³ .......................................... H01R 33/00
[52] U.S. Cl. ................................ 362/226; 362/263; 362/306; 362/350; 362/396
[58] Field of Search ............... 362/226, 296, 389, 396, 362/306, 263, 350; 403/361, 372, DIG. 4, 327, 329

[56] References Cited

U.S. PATENT DOCUMENTS

| | | | |
|---|---|---|---|
| 1,761,344 | 6/1930 | Huber | 403/329 |
| 2,765,581 | 10/1956 | Adler | 403/329 |
| 3,409,858 | 11/1968 | Krehbiel | 403/329 |
| 4,219,870 | 8/1980 | Haraden | 362/226 |

Primary Examiner—Donald P. Walsh
Attorney, Agent, or Firm—Lawrence R. Fraley

[57] ABSTRACT

An improved projection unit which enables front removal of the unit's tungsten halogen projection lamp from the unit's glass reflector. A first retention means in the form of a boxlike metallic "can" is secured to the lamp's press-sealed end and held in place by a pair of depressible, cantilever springs, each of which is secured to opposing sides of the metallic can and capable of being depressed to enable insertion and removal of the lamp and can components. At full insertion of the lamp, each spring deflects to an expanded position to engage the reflector's neck and provide the desired retention.

6 Claims, 3 Drawing Figures

1

FRONT LOADING PROJECTION UNIT WITH SNAP IN CAPSULE

DESCRIPTION

1. Technical Field

The invention relates to incandescent lamp and glass reflector combinations for use in projection systems such as 16 mm. movie and slide projectors.

2. Background

In many projection units which include a preformed glass reflector and projection lamp (e.g. tungsten halogen) therein, the lamp is retained in alignment within the reflector by employing a suitable cement (e.g. sauereisen) within the reflector and about the lamp's sealed end. Examples of such arrangements are shown in U.S. Pat. Nos. 3,314,331 (Wiley) and 3,639,750 (Anthonijsz). Use of cement or a similar permanent-type bonding agent prohibits separation of the lamp and reflector in the event that replacement of either of these components is necessary. In almost all cases, it is only the incandescent lamp which fails and needs replacement. The aforementioned permanent bond between lamp and glass reflector was believed necessary in order to assure the essential, precise alignment between said components and between these members and other elements (e.g. film gate, projection lens) within the overall system. Alignment between reflector and lamp was usually achieved using a precisioned instrument whereupon the assembled unit was ready for insertion within a respective socket-holder arrangement, such as shown in U.S. Pat. No. 3,789,212 (Wagner). This latter positioning is usually accomplished by the projector's operator.

Mandatory replacement of both lamp and glass reflector therefore results in unnecessary waste of material which in turn adds appreciably to the overall cost of operating such systems.

The projection unit of U.S. Pat. No. 4,156,901 (Haraden et al) was designed to eliminate the above undesirable requirement by providing a retention member which is removable from the rear of the reflector yet which also assures positive alignment of the unit's incandescent lamp within the reflector when said lamp is positioned therein. The retention member is secured to the lamp's sealed end and may comprise a metallic "can", a preformed component of insulative material such as ceramic, or a combination of both.

The projection unit of U.S. Pat. No. 4,219,870 (Haraden et al) was designed as an improvement to the unit of U.S. Pat. No. 4,156,901 by providing means whereby the retention member having the lamp's sealed end therein could be removed from the front, concave reflecting portion of the glass reflector. As stated, the method of removal in 4,156,901 was via the rear neck (or collar) portion of the reflector. This earlier arrangement necessitated provision of a relatively large aperture (opening) in the reflector's neck portion thus reducing the total reflective surface of the reflector and, as a result, the unit's total forward output. In addition, rearward removal of the lamp in many projection systems currently available today can prove somewhat difficult due to the limited accessibility to this portion of the unit within most systems. The technique of forward (front) removal understandably overcomes the above and other related disadvantages. In the unit defined in U.S. Pat. No. 4,219,870, a pair of retention members is utilized, one for retaining the sealed end of the lamp and aligning the lamp within the glass reflector while the other, an external clamping member, is slidably positioned within a pair of opposing, exterior slots in the glass reflector's neck portion and functions by slidably engaging upstanding tabs located on the portions of the boxlike first retention member which protrude from the rear of the reflector a necessary distance.

The present invention represents yet another improvement of the variety above by providing a projection unit which permits use of a relatively small opening in the glass reflector to accommodate the unit's lamp and first retention means, both of which are removable from the front of the reflector, and which utilizes at least one depressible spring secured to the first retention means and capable of being depressed to enable insertion and removal of the lamp and first retention means. The depressible spring is thus capable of being inserted along with said components and thereafter released to positively engage a surface of the rear portion of the reflector and secure these components in position.

It is believed therefore that a projection unit which provides the above improvements, as well as those defined in greater detail below, constitutes a significant advancement in the art.

DISCLOSURE OF THE INVENTION

It is, therefore, a primary object of the present invention to enhance the projection unit art by providing a projection unit which permits ready separation of the unit's projection lamp and glass reflector components and which also provides the several advantageous features described herein.

In accordance with one aspect of the invention, there is provided an improved projection unit which includes a glass reflector, an incandescent projection lamp, a first retention means which is removably oriented within the glass reflector and serves to align the lamp within the reflector, and a second retention means for retaining the first member within the glass reflector and permitting removal thereof through the reflector's front portion. The improvement to the unit comprises providing a second retention means which is a depressible spring secured to the first means for being depressed to permit insertion and removal of the first retention means and, once positioned within the reflector's opening, is capable of being released to engage the reflector and effect retention of the first retention means.

BEST MODE FOR CARRYING OUT THE INVENTION

For a better understanding of the present invention together with other and further objects, advantages and capabilities therefore, reference is made to the following disclosure and appended claims in connection with the above-described drawings.

Figure 1:
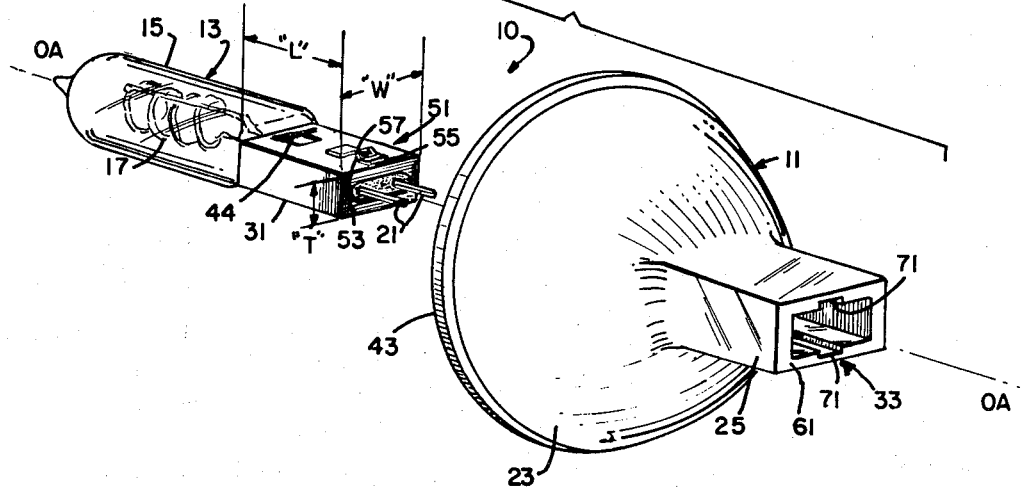
FIG. 1 is an exploded isometric view of a projection unit in accordance with a preferred embodiment of the invention.
Figure 2:
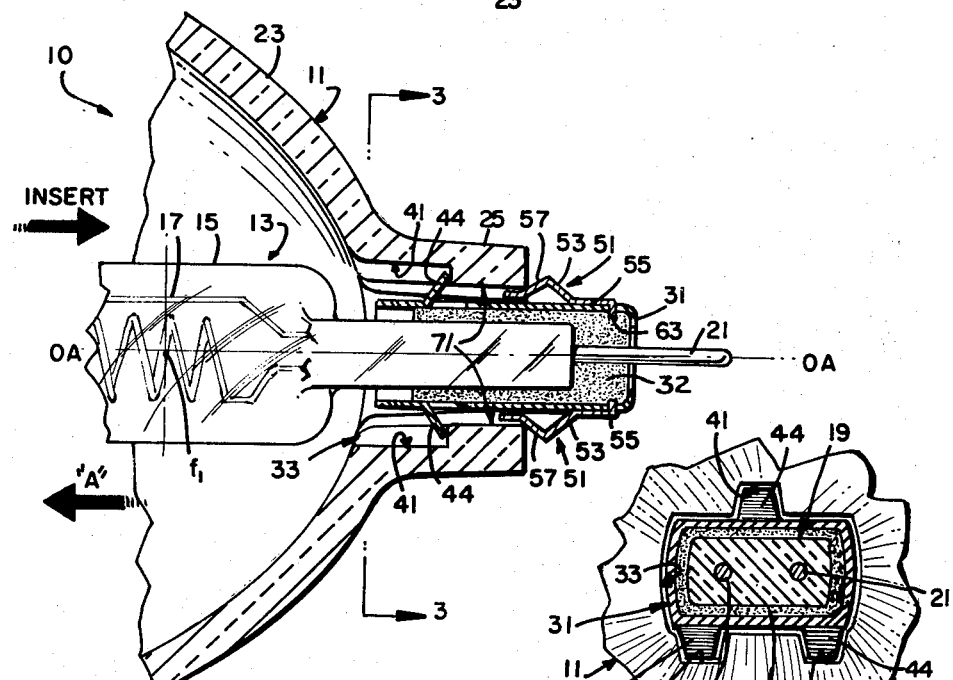
FIG. 2 is an enlarged, partial side elevational view, partly in section illustrating the positioning of the lamp and first and second retention means of the invention within the opening provided within the invention's glass reflector.
Figure 3:
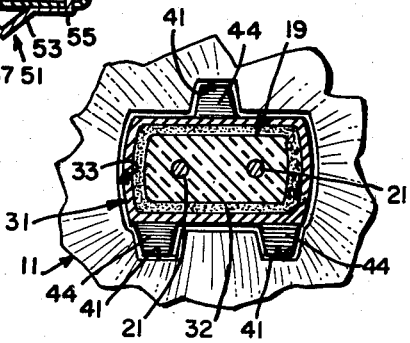
FIG. 3 is a partial front elevational view, partly in section, as taken along the line 3—3 in FIG. 2, illustrating the upstanding segments of the invention as being located within the grooves provided within the glass reflector's rear opening.

With particular reference to FIG. 1, there is illustrated a projection unit 10 in accordance with a preferred embodiment of the present invention. As stated, unit 10 is particularly adapted for use within a projection system such as a slide or 16 mm. movie projector. Accordingly, projection unit 10 would be located within a suitable socket-holder assembly (not shown) such as described and shown in the aforementioned U.S. Pat. No. 3,789,212. Projection unit 10 includes a glass reflector 11 and an incandescent projection lamp 13 adapted for being located within reflector 11 (FIG. 2). A preferred lamp for use in unit 10 is one of the tungsten-halogen variety listed under ANSI Code ELH, and produced and sold by the assignee of the invention. This lamp produces 300 watts, is operable at normal line voltages, and possesses an average life of 35 hours. The envelope portion 15 of lamp 13 includes a CC8 tungsten filament structure 17 which is electrically connected within the lamp's press sealed end 19 (adjacent envelope 15) to a pair of contact pins 21 which project from end 19. Lamp 13 is thus activated when pins 21 are connected to a suitable socket component (not shown) and the corresponding projection system placed in operation. Other lamps suitable for use in unit 10 include those listed under ANSI Code ENH and ENX, said lamps also produced and sold by the assignee of this invention. ENH lamps operate at normal line voltages and are capable of producing 250 watts over an average life of 175 hours. ENX lamps produce 360 watts, operate at 82 volts, and are rated as having an average life of 75 hours. Both ENH and ENX type lamps utilize a CC8 filament structure. Still other lamps for use in unit 10 include those producing from between 80 to 250 watts and operational at the relatively low voltage ranges of between 12 and 24 volts. Lamps of this type typically use C6 or CC6 filaments and have an average operating life of between 25 and 1000 hours. These latter defined lamps are listed under such ANSI Code designations as DED, EJA, EJM, EJN, EJL, and ELC. The contact pins 21 typically employed in tungsten halogen lamps of the variety described above are of molybdenum or similar conductive material.

Reflector 11 is preferably made of hard glass (e.g., borosilicate) and includes a forward (or front) concave reflecting portion 23 and a hollow rear neck portion 25 adjacent thereto. Reflecting portion 23 is preferably elliptical or parabolic in configuration and includes a dichroic mirror coating (not shown) on its interior surface to permit much of the heat generated by lamp 13 to pass therethrough while still reflecting the lamp's visible light output in a forward direction "A". Such coatings are known in the art and typically can withstand temperatures of 500 degrees Celsius with no resultant shift in characteristics.

As earlier stated, alignment between lamp 13 and reflector 11 is extremely critical in order to assure optimum forward output of unit 10. Understandably, alignment is also critical between unit 10 and the remaining elements of the overall projection system, such as the projector's film gate and projection lens. Such elements are well known in the prior art and are not illustrated here. To maintain said alignment between lamp 13 and reflector 11, a first retention means 31 is utilized and is fixedly secured to sealed end 19 of lamp 13 using, for example, a suitable bonding cement 32 (e.g., saureisen).

Means 31, as illustrated, is a metallic member (e.g., no. 26 ga. steel having a thickness of 0.018 inch) and is of a substantially boxlike configuration to thus encapsulate almost the entirety of sealed end 19. The function of this member is to retain lamp 13 in alignment within reflector 11 such that the envelope is oriented within concave portion 23 of reflector 11 and the lamp's sealed end 19 is located substantially within neck 25 (FIG. 2). Member 31 and lamp 13 thus form a based capsule member.

To accommodate member 31 (and therefore the sealed end 19 of lamp 13), rear neck portion 25 of reflector 11 includes a relatively small opening 33 therein. As stated, use of a small opening results in an increase in total internal reflective area to in turn provide a corresponding increase in total forward light output for the invention in comparison to the unit depicted in the aforementioned U.S. Pat. No. 4,156,901. Opening 33 is substantially rectangular in cross section to accomodate the similarly shaped boxlike member 31. In addition, this opening also includes a plurality of grooves therein which function in the manner defined below.

As yet another improvement, it can be seen in FIG. 2 that a greater amount of glass material is provided in the side of neck portion 25 of reflector 13, as well as in the juncture location between concave portion 23 and neck 25, in comparison to the unit described in U.S. Pat. No. 4,156,901. Added use of such material serves to strengthen reflector 13 in these areas, thus facilitating both handling and shipping of said component. It should also be noted that reflector 11 is substantially shorter (front to back) than the described reflector in U.S. Pat. No. 4,156,901 to result in an overall savings in glass material.

Lamp 13 is retained within reflector 11 such that the CC8 filament structure 17 lies on the reflector's optical axis OA—OA and in the focus ($f_1$) of the ellipse of the reflector. In this position, the longitudinal axis of lamp 13 lies coincidental to axis OA—OA. To facilitate the aforementioned positioning of member 31 and alignment of lamp 13 within reflector 11, a plurality of grooves 41 are located within opposing (upper and lower) surfaces of opening 33 and terminate at a preestablished distance from the front surface 43 (FIG. 1) of the reflector. Grooves 41 receive a corresponding number of upstanding segments 44 which extend from opposite sides of the boxlike retention member. As shown, a single groove 41 is located in the upper surface of opening 33 while a pair (two) of grooves are within the opposing, lower surface. Accordingly, a similar number of segments 44 are utilized, the lower two of which project offcenter in comparison to the upper segment 44 which is shown as being substantially centrally disposed in the forward portion of member 31. Understandably, it is possible to vary the number and/or positioning relationship of segments 44 and corresponding grooves 41 and achieve the results intended (below). For example, it is possible to locate two segments on the upper surface, and either the same number of such elements or even a single element on the lower side. Other combinations are within the scope of the invention and further description is not deemed necessary. The arrangement depicted assures both proper rotational orientation of lamp 13 within the reflector as well as proper depth of insertion of member 31 and lamp 13 within the reflector's rear neck portion.

In the arrangement depicted in the drawings, boxlike retention member 31 is designed to fit snugly within opening 33 to provide the described necessary, critical alignment. To prevent this member from becoming displaced as might occur from the vibrations or other movements typically experienced in the operation and handling of projection systems, the invention includes a second retention means 51 which represents a significant improvement over the member described and illustrated in the aforementioned U.S. Pat. No. 4,219,870. Means 51 comprises at least one depressible spring 53 which is secured to member 31, preferably by welding, and is capable of being depressed during insertion of lamp 13 and member 31 within opening 33 to enable insertion of all three components in a facile manner without adversely affecting (e.g., scratching the internal surfaces of opening 33 or causing neck portion 25 to fracture) reflector 11. Once member 31 reaches its fully inserted position (FIG. 2), spring 53 attempts to return to its original, expanded position and in doing so engages an edge of rear portion 25 to thus positively retain member 31 in the desired position within opening 33. As shown in FIG. 2, two springs 53, each located on an opposing side (the same sides as those containing segments 44) of member 31, are preferably utilized. Each is secured at one end (55) and includes a forward, angular section 57 which provides the described engagement with neck 25. Accordingly, each spring 53 is a cantilever. Each is also metallic (e.g., stainless steel) and is produced from flat stock material having a thickness of about 0.007 inch. Dimensionwise, the boxlike retention member 31 has a width ("W") of about 0.485 inch, a thickness ("T") of about 0.245 inch, and a length ("L") of about 0.600 inch. Each upstanding segment 44 projects a distance of about 0.030 inch from the respective surface of member 31. Each cantilever spring 53, made from the above steel stock, possesses an original (before bending) overall length of about 0.328 inch and a width of 0.125 inch. The engaging forward angular edge 57 forms an angle of between 50 and 70 degrees with the planar back surface 61 of reflector 11 at engagement. In addition, the end 55 of each spring includes a latching segment 63 which inserts and locks within member 31 to further assure securement of the spring thereto. It is also possible to utilize more than the number of springs illustrated to accomplish the results described herein. Specifically, it is possible to use a one-to-two combination positioned in a similar manner as segments 44. Other such combinations being possible, added description is not believed necessary.

To facilitate the aforementioned mode of positioning lamp 13, member 31, and springs 53 within reflector 11, a pair of longitudinal slots 71 are provided within the opposing upper and lower surfaces of opening 33, each for accommodating a respective one of the springs 53. Accordingly, it is the upper (and lower) edges of neck 25 which define slots 71 that are subsequently engaged by angular portion 57.

One of the significant features of depressible springs 53 is that this mode of retention allows for some variation in glass thicknesses for reflector 11 while still providing the positive retention defined. Specifically, the wall thicknesses of neck portion 25 can vary, as well as the overall length of this portion of the reflector, without resulting in harm thereto (e.g., fracture) during insertion and engagement. In addition, the invention provides for facile removal of the lamp and retention member components from the glass reflector without requiring relatively complex release procedures and/or mechanisms. It is only necessary during initial stages of removal to engage and depress an external surface of each spring (at portion 57) while simultaneously pulling forward on lamp 13. Most importantly, accessibility to this region of unit 10 can be easily provided in most projection systems currently available without substantial modifications to the system's housing. The invention is thus readily adaptable for use within most of today's projection systems.

While there have been shown and described what are at present considered the preferred embodiments of the invention, it will be obvious to those skilled in the art that various changes and modifications may be made therein without departing from the scope of the invention as defined by the appended claims. For example, it is possible to offset the slots 71 used to accommodate springs 53 and thus assure only one manner of insertion in the event that the orientation of segments 44 does not already provide this feature (as they do in the example illustrated).

What is claimed is:

1. In a projection unit including a glass reflector having a front concave reflecting portion and a rear neck portion having a substantially rectangular opening therein, an incandescent lamp including an envelope portion and a sealed end adjacent said envelope portion, first retention means of a substantially boxlike configuration secured to said sealed end of said lamp for retaining said lamp therein and aligning said lamp within said reflector whereby said envelope portion will be positioned substantially within said front concave reflecting portion and said sealed end will be positioned substantially within said substantially rectangular opening within said rear neck portion, said substantially boxlike first retention means removably positioned within said opening and adapted for being removed through said front concave reflecting portion of said reflector, and second retention means for retaining said first retention means within said substantially rectangular opening of said reflector and permitting removal thereof through said front concave reflecting portion, the improvement where said substantially rectangular opening includes a longitudinal slot within a surface thereof and said second retention means comprises at least one depressible, cantilever spring secured at one end thereof to said substantially boxlike first retention means, said cantilever spring including an angular engaging portion for moving within said longitudinal slot during insertion and removal of said first retention means and capable of being depressed to a first position to enable said insertion and removal, said cantilever spring releasing to a second, expanded position such that said angular engaging portion engages an edge of said rear neck portion of said reflector when said first retention means is fully inserted within said substantially rectangular opening to effect said retention of said first retention means within said opening.

2. The improvement according to claim 1 wherein said substantially rectangular opening further includes a second longitudinal slot within a second surface thereof, said second retention means further including a second depressible, cantilever spring, said second cantilever spring secured at one end thereof to a second, opposed surface of said substantially boxlike first retention means from the first cantilever spring and including an angular engaging portion, said second cantilever spring moving within said second longitudinal slot during said insertion and removal of said first retention means and capable of being depressed to a first position to enable said insertion and removal, said second cantilever spring releasing to a second, expanded position such that said angular engaging portion engages an opposite edge of said rear neck portion of said reflector from said edge engaged by the first cantilever spring when said first retention means is fully inserted within said substantially rectangular opening.

3. The improvement according to claim 2 wherein said substantially rectangular opening within said rear neck portion of said glass reflector includes first and second grooves located within opposed surfaces thereof, and said substantially boxlike first retention means includes first and second upstanding segments thereon, each of said upstanding segments projecting from a respective one of said opposed surfaces of said first retention means for aligning with and being located within a respective one of said grooves when said substantially boxlike first retention means is positioned within said substantially rectangular opening.

4. The improvement according to claim 3 further including a third groove within one of said opposed surfaces of said opening, said first retention member further including a third upstanding segment thereon projecting from one of said surfaces of said substantially boxlike first retention means adjacent said second upstanding segment for aligning with and for being located within said third groove when said substantially boxlike first retention means is positioned within said opening.

5. The improvement according to claim 1 wherein said depressible spring is of a thin, metallic material.

6. The improvement according to claim 5 wherein said metallic material of said spring is steel.

* * * * *